United States Patent
Tiwari et al.

(10) Patent No.: US 10,042,883 B2
(45) Date of Patent: *Aug. 7, 2018

(54) SYSTEM AND METHOD FOR ASYNCHRONOUS CONSUMER ITEM SEARCHING REQUESTS WITH SYNCHRONOUS PARALLEL SEARCHING

(71) Applicant: Zumur, LLC, Greenville, SC (US)

(72) Inventors: Abhishek Tiwari, Princton, NJ (US); Jack Shedd, Chicago, IL (US); Brian William Wolter, New York, NY (US)

(73) Assignee: Zumur, LLC, Greenville, SC (US)

( * ) Notice: Subject to any disclaimer, the term of this patent is extended or adjusted under 35 U.S.C. 154(b) by 818 days.

This patent is subject to a terminal disclaimer.

(21) Appl. No.: 14/480,336

(22) Filed: Sep. 8, 2014

(65) Prior Publication Data

US 2015/0178807 A1    Jun. 25, 2015

Related U.S. Application Data

(60) Provisional application No. 61/918,970, filed on Dec. 20, 2013.

(51) Int. Cl.
*G06Q 30/00* (2012.01)
*G06F 17/30* (2006.01)
(Continued)

(52) U.S. Cl.
CPC .. *G06F 17/30412* (2013.01); *G06F 17/30693* (2013.01); *G06F 17/30864* (2013.01);
(Continued)

(58) Field of Classification Search
CPC ............ G06Q 30/0601–30/0645; G06Q 30/08
(Continued)

(56) References Cited

U.S. PATENT DOCUMENTS 6,976,005 B1 * 12/2005 Bansal ............... G06Q 30/0617
705/26.3
7,818,209 B1   10/2010 Lu
(Continued)

OTHER PUBLICATIONS

Heydon et al. "Mercator: A scalable, extensible web crawler" [online] published 1999. [Retrieved on May 24, 2017] from [https://webarchive.jira.com/wiki/download/attachments/5441/1999-Mercator.pdf].*

*Primary Examiner* — Resha Desai
*Assistant Examiner* — Lindsey B Smith
(74) *Attorney, Agent, or Firm* — Douglas W. Kim; Douglas Kim Law Firm, LLC

(57) ABSTRACT

This invention is a system for providing persistence searching for consumer items that performs the steps of: retrieving a set of get requests uniquely associated with external vendor sites wherein each get request is specifically formatted for its external vendor site and simultaneously transmitting the set of get requests to the respective external vendor sites. Asynchronously receiving current results from the external vendor sites, extracting the price from the current results for each item contained in the current results received from the external vendor sites, comparing the extracted price of the current results with the price of a previously stored results, generating a notification and including in the notification, a link to the external vendor site to provide a purchasing opportunity to a user where the price of the current results is lower than the price of the stored results.

20 Claims, 10 Drawing Sheets

(51) Int. Cl.
*G06Q 30/06* (2012.01)
*G06Q 30/02* (2012.01)
*G06Q 30/08* (2012.01)

(52) U.S. Cl.
CPC ......... *G06Q 30/0202* (2013.01); *G06Q 30/06* (2013.01); *G06Q 30/0601* (2013.01); *G06Q 30/0611* (2013.01); *G06Q 30/0625* (2013.01); *G06Q 30/0629* (2013.01); *G06Q 30/0631* (2013.01); *G06Q 30/08* (2013.01)

(58) Field of Classification Search
USPC ............................................... 705/26.1–27.2
See application file for complete search history.

(56) References Cited

U.S. PATENT DOCUMENTS

| | | |
|---|---|---|
| 8,301,764 B2 | 10/2012 | Konig |
| 8,359,301 B2 | 1/2013 | Aziz |
| 8,438,080 B1 | 5/2013 | Xiao |
| 2008/0140577 A1 | 6/2008 | Rahman |
| 2008/0140581 A1* | 6/2008 | Mayer ................ G06Q 30/0601 705/80 |
| 2009/0171950 A1* | 7/2009 | Lunenfeld ......... G06F 17/30864 |
| 2012/0123910 A1 | 5/2012 | George |
| 2012/0259882 A1 | 10/2012 | Thakur |
| 2012/0265736 A1 | 10/2012 | Williams |

* cited by examiner

SYSTEM AND METHOD FOR ASYNCHRONOUS CONSUMER ITEM SEARCHING REQUESTS WITH SYNCHRONOUS PARALLEL SEARCHING

FIELD OF THE INVENTION

This invention is directed to a system and method for discovering, summarizing, computing, aggregating and displaying sourced object hierarchies in an orthogonal manner. Specifically, this invention relates to the needs of a person to discover and summarize information from disparate sources of information. Generally, it applies to the field of product search and consumer information.

BACKGROUND

Search engines are known in the art. However, these search engines lack significant features resulting in "hit-and-miss" results to the user. For example, a search for "Columbia Outerwear" can result in the user being presented with results for Columbia, South America or Columbia, S.C. Further, traditional search engines are a "one-and-done" methodology so that once the search is performed, additional results require an additional search. When the additional search is performed, the results from the first search are lost and therefore not integrated with the results from a second search.

The conventional method for producing stable object hierarchies from disparate sources is to craft three independent processes. The first, often called the "spider", crawls, or retrieves, large numbers of possible object sources, often in batch storing states for each source in aggregate. A second process is then initiated which summarizes the states of each source, storing an object state summary. Finally, a user-facing process is provided which allows a person to retrieve the object state summary based on identifiers preselected by the process. This method is inadequate for situations when sources cannot or should not be summarized or aggregated in the past. The architecture of the process is itself flawed, as sources which cannot be summarized in the past, for current retrieval, cannot then be retrieved, as the summary process is dependent on a large collection of objects to compare against when building a hierarchy.

Therefore, it is an object of the current invention to provide for a system that performs a real time on-demand, as well as batch based searching for goods or services with specific search criteria, and returns a set of search results that are deduped and can be updated when modifications to the search results occur.

SUMMARY OF THE INVENTION

The above objectives are accomplished by providing a system for providing persistence searching for consumer items comprising a server having a processor, computer readable medium and a set of computer readable instructions, that when executed by the processor, perform the steps of: retrieving a set of get requests uniquely associated with external vendor sites from a get request queue wherein each get request is specifically formatted for its external vendor site, determining if the set of get requests has been performed within a predetermined period of time and simultaneously transmitting the set of get requests to the respective external vendor sites if they have not been performed within a predetermined period of time, asynchronously receiving current results from the external vendor sites in response to the set of get requests, determining if duplicate items are present in the results and deleting duplicate items from the results, extracting the price from the current results for each item contained in the current results received from the external vendor sites, comparing the extracted price of the current results with the price of a previously stored results for each item from each external vendor site, generating a notification representing that the price of the current results is lower than the price of the stored results, if the price of the current results is lower and including in the notification, a link to the external vendor site to provide a purchasing opportunity to a user where the price of the current results is lower than the price of the stored results.

The invention can include where the set of computer readable instructions includes instructions to generating a notification representing that the price of the current results is within a predetermined range of the price of the stored results and generating a notification representing that the price of the current results is within a predetermined percentage of the price of the stored results.

When the external vendor site is an auction site and the set of computer readable instructions includes auction site instructions for the auction site, the invention can include instructions for: determining the time window of the auction site, retrieving a get request associated with the auction site from the get request queue, (a) transmitting the get requests to the auction site, (b) receiving results according to the get request, (c) resetting the time window to half its value, determining if the elapsed time is less than the time window value and performing instructions (a) through (c) if the elapsed time is less than the time window and for so long as the time window is greater than a predetermined end time. In one embodiment, the predetermined end time is sixty seconds or less.

The auction site instructions can include instructions for determining if the initial time window is greater than a predetermined period of execution time and halting the execution of the auction site instructions if the initial time window is greater than the predetermined period of execution time. In one embodiment, the predetermined period of execution time is 24 hours or greater. In one embodiment, the predetermined period of execution time is 24 hours.

The invention can include a set of auction instructions that determine if the external site is an auction site and if so, determine the time window of the auction site, retrieve a get request associated with the auction site from the get request queue, (a) transmit the get request to the auction site, (b) receiving results according to the get request, (c) resetting the time window to half its value, determining if the elapsed time is less than the time window value and preforming instructions (a) through (c) if the elapsed time is less than the time window and for so long as the time windows is greater than a predetermine end time. In one embodiment, the persistent agent instructions include instructions to generating a notification representing that the price of the current results is within a predetermined range of the price of the stored results.

DESCRIPTION OF THE DRAWINGS

The following description of the invention will be better understood by reference to the following drawings that are incorporated and made part of the written specification.

DESCRIPTION OF THE INVENTION

Figure 1:
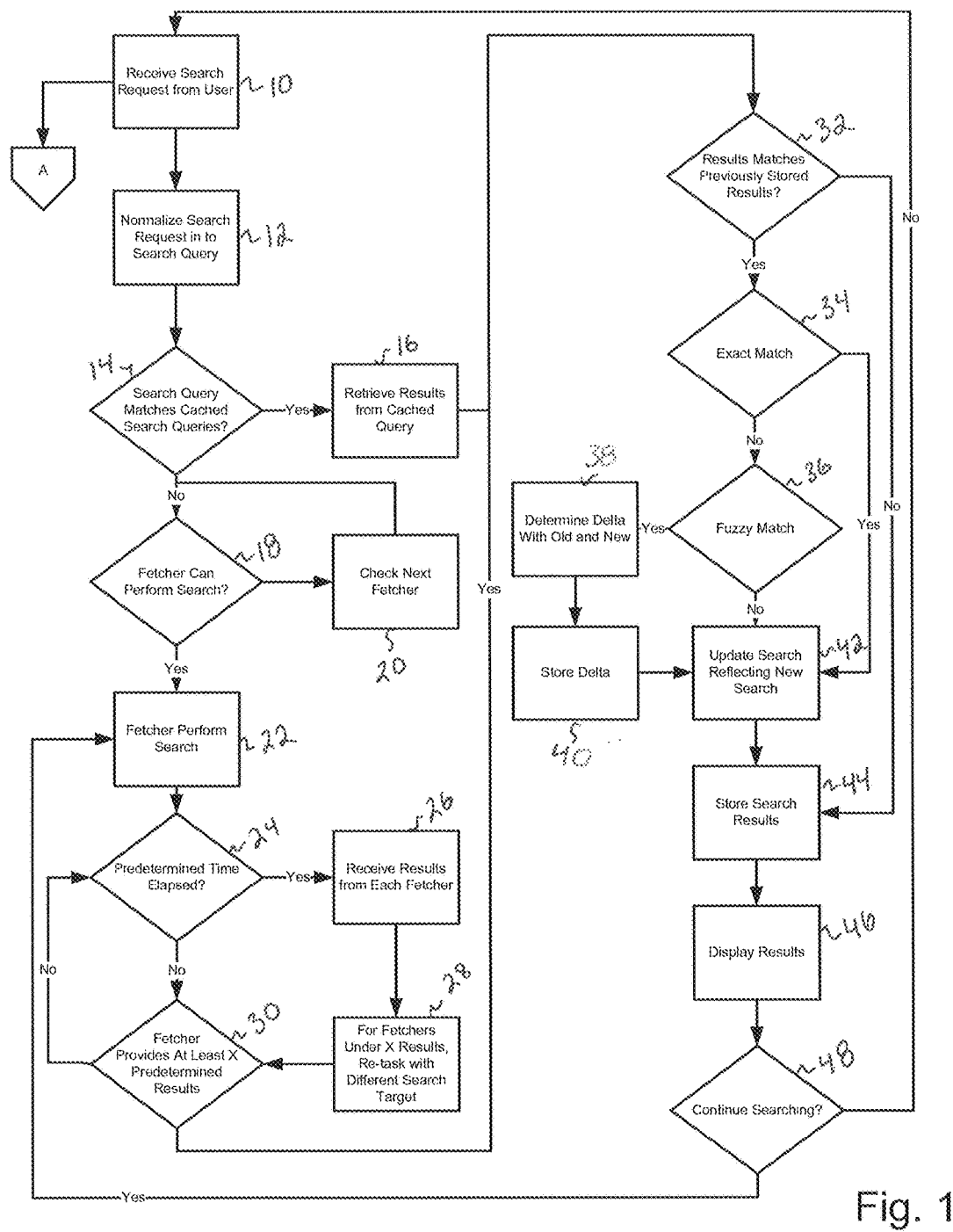
FIG. 1 is a flow chart of the functional flow of invention.

Computer readable instructions, when executed by a computer processor, cause the computer to perform a series of steps to accomplish a specific task and results in useful, concrete and tangible results. These computer readable instructions can be tied to a particular machine or apparatus with the specific purpose of executing the computer readable code for accomplishing tangible results, and represents and accomplishes the manipulation of physical data.

The detailed description that follows may be presented in terms of program procedures executed on a computer or network of computers. These procedural descriptions are representations used by those skilled in the art to most effectively convey the substance of their work to others skilled in the art. These procedures herein described are generally a self-consistent sequence of steps leading to a desired result when executed by a computer and its processor representing or resulting in the tangible manipulation of physical objects. These steps also require physical manipulations of physical quantities such as electrical or magnetic physical elements and are capable of being stored, transferred, combined, compared, or otherwise manipulated readable medium that is designed to perform a specific task or tasks. Actual computer or executable code or computer readable code may not be contained within one file or one storage medium, but may span several computers or storage mediums. The term "host" and "server" may be hardware, software, or combination of hardware and software that provides the functionality described herein.

The present invention is described below with reference to flowchart illustrations of methods, apparatus ("systems") and computer program products according to the invention. It will be understood that each block of a flowchart illustration can be implemented by a set of computer readable instructions or code.

Elements of the flowchart support combinations of means for performing the special functions, combinations of steps for performing the specified functions and program instruction means for performing the specified functions. It will be understood that each block of the flowchart illustrations can be implemented by special purpose hardware-based computer systems that perform the specified functions, steps, or combinations of special purpose hardware or computer instructions.

The present invention is now described more fully herein with reference to the drawings in which the preferred embodiment of the invention is shown. This invention may, however, be embodied in many different forms and should not be construed as limited to the embodiment set forth herein. Rather, these embodiments are provided so that this disclosure will be thorough and complete and will fully convey the scope of the invention to those skilled in the art.

In one description of the invention, the following terms are used to refer to sets of computer readable instructions that, when executed by a processor of a computer, solve the technological problem of searching multiple unrelated sites for goods or services simultaneously within a predetermined period of time with task distribution balancing. The invention improves the functioning on the computer itself and the technological field of searching good and services for sale. The following sets of computer readable instructions are used in this specification: user agent, fetcher parser and broadcaster.

In the present invention, an architecture of connected systems works to produce a list of objects related to a query by a user. The query is parsed, producing an array of commands to be executed concurrently by the architecture. As the commands are executed, each system within the architecture produces a new state, or delta, which describes a change to the aggregate state of the system. As each delta is created, it is returned to two parties: the user who initiated the query, and a storage system which aggregates the delta together with all other deltas to produce a new state. The user is notified of each delta as its created, inclusive of the delta of the state produced by the storage system. The user's system in turn aggregates each delta to produce a new state specific for the user.

In one embodiment, the architecture is composed of six independent processes, each capable of executing independently and without regard to the requirement or state of any other process. Each process produces a delta, or summary of the difference between the previous state of the system and the new state of the system. Deltas are returned to any system which provides the producing system its initial command set.

In one embodiment, the process is initiated by a user agent, which provides a set of keywords, or query, or term, of which a user is expecting to discover objects related to that term from a set of prescribed but disparate sources. This user agent itself may be initiated in an on-demand fashion by a user or per a batch scheduled by the system. An example of keywords is shown in the following Table 1.

TABLE 1

| Description | Price |
|---|---|
| Title | URL |
| Vendor | Product Rating |
| User Rating | Distance from a Physical Location |

The query is transmitted to an originating system, which can translate the user's query into an array of commands in the form of HTTP GET request templates. The originating system places each command onto a queue, marking each as incomplete. The queue may or may not be singular in nature, as the originating system can opt at runtime to place the command on one or more queues, depending.

A second system, or fetcher, watches one or multiple queues for commands to be executed. A fetcher may be one or may be many, as the number of fetcher systems required to execute the given depth of commands on the queue may grow dependent on the depth of the commands. One or more fetchers will execute each command on the queue, producing a string of characters. The fetchers can reach to multiple source systems simultaneously and in real-time. The searching can be actual on-demand and in real-time from independent outside sources for any given query in contract to the current state of that which uses self-contained internal databases. This string is compared against previous strings the fetcher has produced for the given source and a delta of the string is produced. This delta is then transmitted to one or many queues.

The fetchers are independent objects that work asynchronously. Unlike traditional systems which house data internal to an environment and access that data when a consumer requests it and/or there's some other system process that requests it, the invention, through its fetchers, reaches out to a variety of external sites, all concurrently, with each fetcher going to a unique source on-demand and in real time and gathering results for the unique query. The fetcher's activities are driven by either, in real-time, by a user queries or by a batch scheduled, system request. Upon either type of request, the system spawns a fetcher for each source provider and the fetchers immediately go out, submit, gather, and return results to the system. Upon return of results, each set is analyzed by a unique parser (e.g. one parser per source engine), another system component. All parsers act in parallel and each parser deconstructs and normalizes its unique set of results for uniform presentation of all results in parallel to the user.

A third system, or parser, watches one or multiple queues for commands to be executed. These commands take the form of string deltas. The parser, which may be one or may be many, examines the string delta, reconstructing a complete string from the delta history of its records, analyzing the resulting string for a sequence of characters which may or may not map to the properties of an object, depending on the construction and contents of the string. The system may produce one or many objects from the command. Each object is placed onto one or many queues.

A fourth system, the broadcaster, watches one or many queues for objects. Each object is retrieved from the queue, and compared against the system's history of all objects, and a delta is produced for that object. A null may be produced if the object has no difference from past objects. When a non-null delta is produced, the delta is placed on one or many queues.

A fifth system, the storage, watches one or many queues for new object deltas. Each delta is retrieved from the queue and compared against the current state of the storage system producing a delta of the differences. This delta is placed in permanent storage. The storage platform places a message on one or many queues describing the current state of the system.

The sixth system, the user client, watches one or many queues for state change messages. These messages are translated into an object set which can be displayed to the user as a list of objects related to their originating term.

This process occurs out of order across numerous simultaneous originating queries, for as many users as have access to the system. Each step of the process is performed atomically, and each step works on the smallest possible amount of data necessary to produce the appropriate delta.

Following is an embodiment that is described by a series of computer readable instructions that, when executed by a computer, perform the following functionality. The steps are listed in linear fashion, but can also be executed parallel to each other and in multiple instances and on a single server or across several servers. The computer readable instructions provide a computer implemented method performed across a series of server systems comprising: (a) an originating service or server receiving a user command; (b) a collection of independent services or servers which perform distinct, atomic operations on a set of data related to the user query; (c) a decoupled system for storing or acting as a queue independent of connection or association with any specific server or service; (d) receiving a command which is translated from a single command or request into multiples of that command for disparate systems; (e) passively transmitting the command set to the items of element (c) through the use of element (b); (f) which acts on the command in an unranked system in parallel to other commands; (g) which acts on the command automatically; (h) which computes deltas for state changes within each system of element (b) without comparing or analyzing any state of any other system within element (b); (i) which produces, in aggregate, a delta of an overall system change in aggregate from all deltas produced from all systems of element (b); and (j) which transmits each delta upon its calculation both to a user and to a permanent storage system.

When a user creates an account with the current invention, the user can enter information such as shown in Table 2.

TABLE 2

| USER NAME | String |
| PASSWORD | String |
| CHALLENGE QUESTION | String |
| DEMOGRAPHICS (Age, Gender, etc.) | Integer/String |
| CHALLENGE QUESTIONS (Pre-Determined) | String |

In one embodiment, demographics are discovered directly from the user in the form is direct questions. For example, when creating an account, the user can be prompted to answer the questions "What is your age?". In one embodiment, demographics can be determined from answers to Challenge Questions. For example, if the Challenge Question is "What is the name of the oldest child?". It is known that the user has at least one child. This information can be used to determine specific attributes of the user.

Referring to FIG. 1, the process is initiated when a user enters a search request which is then received at 10 by a set of computer readable instructions on a server that when executed by a processor preforms certain functions. The search request is then formatted into a string and the string can be normalized at 12. A determination can be made at 14 whether the search request matches a search request previously entered by any user that was previously cached at 14. If a match is found, the results from the previously received search request are retrieved from cache at 16 and the search request is marked as completed or preformed. If the current search request is not discovered in cache, the search request needs to be performed.

In one embodiment, there are a plurality of fetchers that can perform searches. The computer readable instructions have the ability to periodically check which searches need to be performed and whether the particular fetchers can perform the search at 18. The determination whether the fetchers can perform the search is made by computer readable instructions. If the fetcher cannot perform the search, the next fetcher can then make a determination if it can perform the search at 20.

If the fetcher can perform the search, the fetcher performs the search targeting to the URL that is currently associated with the particular fetcher at 22. A determination is made at 24 whether a predetermined period of time has elapsed such as a predetermined number of milliseconds that, in one embodiment, is less than 1000. If the period of time has elapsed, the results that the fetcher has retrieved from the third party location are received at 26. If the fetcher has not retrieved a specific number of results, it is an indication that the fetcher is underutilized and the fetcher can be re-tasked to look for results at a second URL at 28. If the fetcher does return a predetermined number of results (a sufficient number of results) as determined at 30, the results are matched with previously stored results at 32.

By using a plurality of fetchers, the invention can search multiple sites in parallel, receive results in a non-linear communication, and optimize searching resources by re-tasking fetchers that do not retrieve a sufficient number of results due to such results either not being available from the third party URL or if the third party URL is experiencing technical difficulty or for some other reason that a predetermined set of results are not found. By way of example and not limitation, the following is a specific example of one possible outcome and functional flow of the invention.

A user wishes to search for a SONY Television, priced around $500, with a 27 inch screen in LED. A first fetcher searches for results matching these criteria at URL Amazon.com; a second fetcher looks for results from URL bestbuy.com. When each fetcher discovered 50 results or a predetermined period of time elapses, the fetchers retrieve the results; the results are de-duped and formatted for display to the user. This process provides for quick access to multiple sites for goods and services in parallel without a linear presentation of search results to the user.

When search results are received from one or more fetchers, the results can be matched to previously stored results for the same or similar search request at 32. If there is an exact match found at 34, the search results are updated with a current time stamp. If the comparison of search results does not result in an exact match, a determination is made whether there is a fuzzy match at 36. In one embodiment, a fuzzy match is when two terms of the following parameters match for two discovered items: URL source, Good or Service Descriptions, Good or Service Title and Price. For example, if the attributes of item 1 are "SONY TELEVISION, This is a 27 inch LED Sony Television Flat Screen, bestbuy.com and $389.99" and item 2 is shown as: "SONY, This is a 27 inch LED Sony Television Flat Screen, hggreggs.com, $389.99" a fuzzy match is determined to have been made as the Description and Price are identical indicating that these items are the same and therefore potentially duplicates. A search engine that is the source of information for the present invention is not necessarily the seller of the product. If the search engines targeted by the fetcher provide a title, price, and end seller match then the result is considered a duplicate. If the price and title match from different search engine sources but the seller is different between them, then the results are not deemed duplicates.

If a fuzzy match is determined, the differences are determined at 38 and the information is stored at 40. The search results are updated to remove duplication at 42 and the results are stored at 44. The results are displayed to the user at 46 and a determination is made whether to continue searching, according to user input, at 48. The user can be satisfied with the search results or can rerun the search request or initiate a persistent search that will inform the user when new items (or existing items are modified) to fall within the range of interest of the user. For example, the user may wish to initiate a persistent search for television that is a SONY 27 inch screen and fall under $350 in price. When results are discovered by a persistent search agent, which run periodically, the user can be notified through SMS messaging, text, email or other means.

Figure 2:
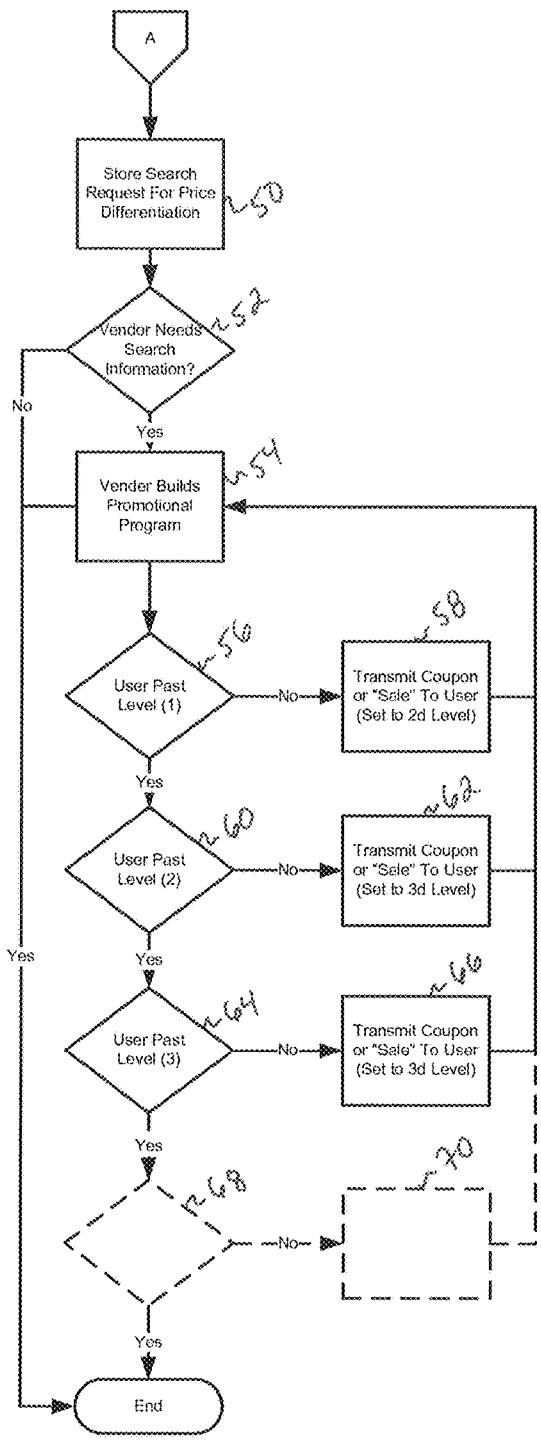
FIG. 2 is a flow chart of the functional flow of the invention.

Referring to FIG. 2, another advantage of the current system is described. Once a user enters a search, including a persistent search, the user is inherently providing an indication that the user would be willing to purchase the described goods or services at or near the price or price range included in the search criteria. Therefore, an indication is given of the willingness and price point of the goods from that user prior to the user actually making a purchase decision. To restate this, a demand curve can be calculated for a good or service using information from potential purchasers based upon the willingness to search for goods or services at a particular price or price range. For example, the following demand can be calculated based upon information from users when requesting searches as shown in Table 3.

TABLE 3

| Price | Quantity of Total Users | Percentage |
|---|---|---|
| $10 | 200 | 36 |
| $20 | 145 | 26 |
| $30 | 110 | 19 |
| $40 | 100 | 18 |

Additionally, with this information, there is an opportunity for the sellers/vendors/suppliers of the particular good/service or comparable or substitute good/service to liquidate an inventory, but advantageously using this information for differential pricing. The seller can determine if there is market information, such as demand curve information, at 50 of FIG. 2. The vendor can decide to use demand information at 52. Assuming that the vendor has good/service to liquidate, the vendor can develop a sales program that contains stages at 54. Initially, and with the aid of the demand information, the seller can determine to provide a coupon, special sales price or other incentive for the goods at the $40 price point for one user and a $36 price point for a second user. This could take several forms such as a 10% coupon for the first user for a good priced at $44 and a 20% coupon for the same good for the second user, a reduced price for a limited period of time, etc. Effectively providing two different coupons uniquely targeted to each of the users which result in a price reduction equal to that specific user's willingness to pay for that good.

Demand data is aggregated and used to determine a "willingness to pay" to produce insight into consumer market behavior. Couponing is then used according to the individual user's willingness to pay to align specific products at the price levels that specific user is willing to pay. The ability to gather, analyze, and present demand data is unique to this invention. When a user initiates a saved search and enters in their willingness to pay for an item they have effectively identified individual demand for a product. Based on the size of the sample, that data in its aggregate provides a statistically viable demand for that product or category. By way of example and not limitation, for product X, with retail value of $10 you have five users (denoted as User 1 through 5) who have set up a persistent search for that product. User 1 through 5 set prices of $9.00, $7.50, $5.00, $4.00 and $2.00 respectively. This data is used to generate a demand curve for product X. In this example at price point of $9.00, a quantity of 1 unit will be sold, at price point of $8.00, again, a quantity of 1 unit will be sold (e.g. User 1), at price point of $7.00 a quantity of 2 units will be sold (e.g. User 1 & User 2), at price point of $6.00, again, a quantity of 2 units will be sold (e.g. User 1 & User 2 again), at price point of $5.00 a quantity of 3 units will be sold (e.g. User 1, User 2, & User 3), at price point of $4.00 a quantity of 4 units will be sold (e.g. User 1, User 2, User 3, and User 4) and so on and so forth as shown in the following table and graph:

| Price | Qty |
|---|---|
| $9.00 | 1 |
| $7.50 | 2 |
| $5.00 | 3 |

-continued

| Price | Qty |
|---|---|
| $4.00 | 4 |
| $2.00 | 5 |

The sales program can be transmitted to the server containing the computer readable instructions. The computer readable instructions then can transmit the coupon, program price or other information to users that are associated with the demand information. In the first pass determined at 56, the users are provided the program information at 58 and decide to purchase goods or services given this program price or coupon for a predetermined period of time. Therefore, the seller seeks to sell the most goods as possible at the highest price of the demand information. At the second pass at 60, the seller can lower the purchase price (or increase the coupon amount or discount) to attempt to capture the purchases that are at the next lowest price at the demand levels. The discount or coupon is passed to the potential purchaser at 62 and the user is provided the opportunity to purchase for a predetermined period of time at 62. Therefore goods or services are sold at the next lowest level. A third stage at 64 and 66 can also be provided for the next lower level of the demand levels. This lowering of the price (or raising of the discount or coupon amount) can be repeated as shown by 68 and 70 till either the program is over, the inventory is liquidated, or some other termination event represented by 72.

Figure 3:
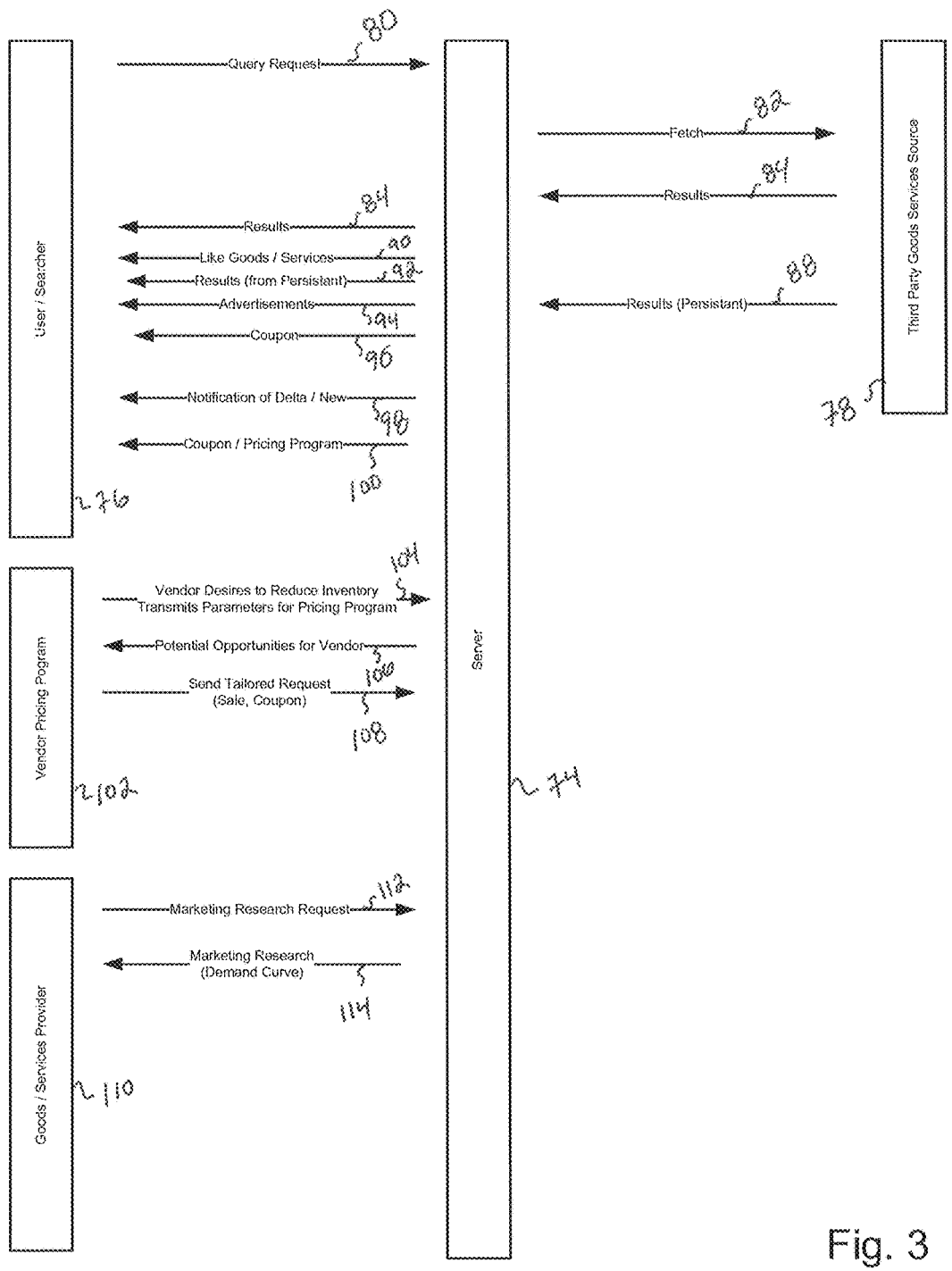
FIG. 3 is a schematic of the functional flow and data flow of the invention.

Referring to FIG. 3, a schematic of the invention is shown. A user having access to a user interface provided by computer readable instructions on a server, such as a SaaS, ASP, or other model, can enter search requests and receive purchase opportunities and search results at 74. Information is transmitted between the user computer and the server 76 that contains computer readable instructions, a compute readable medium and is in electronic communications with the user computer and third party sites, external sites, (URL) or servers (Amazon.com, BestBuy.com, etc.) represented by 78. The user causes a search request 80 to be transmitted to the server. At least one fetcher 82 connects with the third party and retrieves results 84 that are directly associated with the current search or results from a persistent search 86. The results are normalized and displayed to the user at 88. The search results can also return not just the goods that were direct matches to the search request, but can include results 90 like, comparable or substitute goods or services to the user. Persistent results 92 can be displayed to the user periodically or as scheduled or requested by the user. Based upon the search request, advertisements 94 that are specifically selected for the user can be presented/displayed to the user. Coupons 96 or 100 can be provided to the user both based upon the information collected from the user as well as at the request of sellers/vendors. No personal identifying information need be shared with sellers or vendors to provide this functionality. When a good or service changes (e.g. a price drops), this information 98 can be provided to the user either on request or as a periodic function based upon the users wishes.

When a vendor computer 102 accesses the server, the vendor can receive demand information 104 that can be used by the vendor for a specific pricing or sales program such as when attempting to liquidate inventory. The server can also transmit pricing and sales opportunities to the vendor at 106. The seller or vendor can transmit a pricing program (coupons, discounts, one time sales prices, etc.) 108 to the server.

The information gathered from the server can also be used by a third party such as marketing research companies 110. Such companies or entities can request marketing information 112 and receive such information at 114. Marketing information can include buying habits, produce search numbers and information, length of search effort by user, purchase prices, search criteria and the like.

Figure 4:
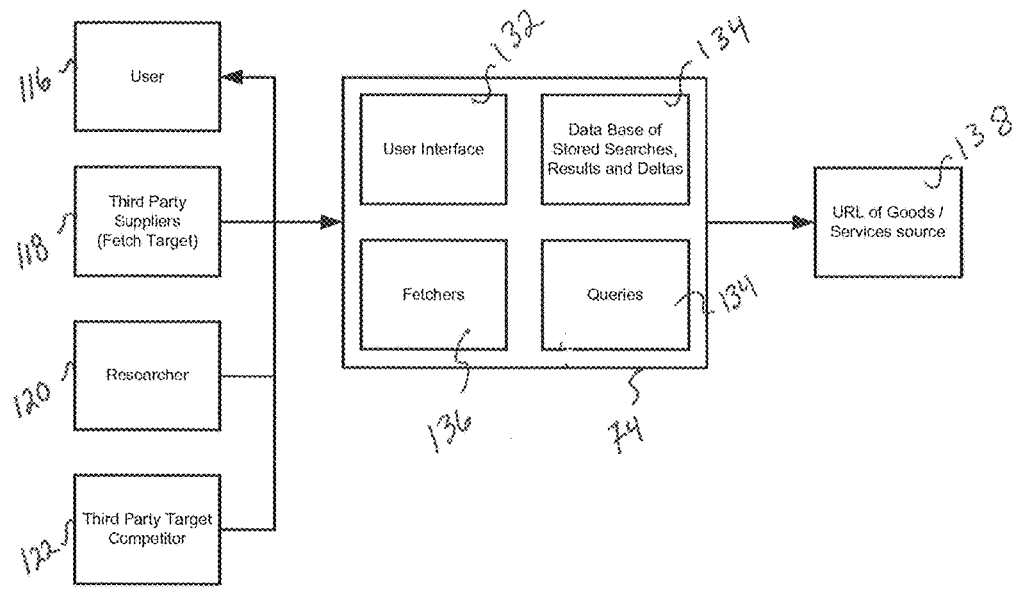
FIG. 4 is a schematic of components of the invention.

Referring to FIG. 4, various components of the present invention are described. Through electronic communications, user computer 116, third party suppliers/sellers/vendors computer 118, market research entity computer 120 and third party seller/competitors computer 122 can communicate with server 124. The server can include a computer readable medium, computer storage and computer readable instructions that, when executed by a processor, included with the server, perform the functionality of the invention. The computer readable instructions can include a user interface 132, database of stored searches, queries, and deltas 134, fetchers 136 and demand/market data 138. The server can be in communications with a plurality of third party sources for discovered goods and services 140.

Figure 5:
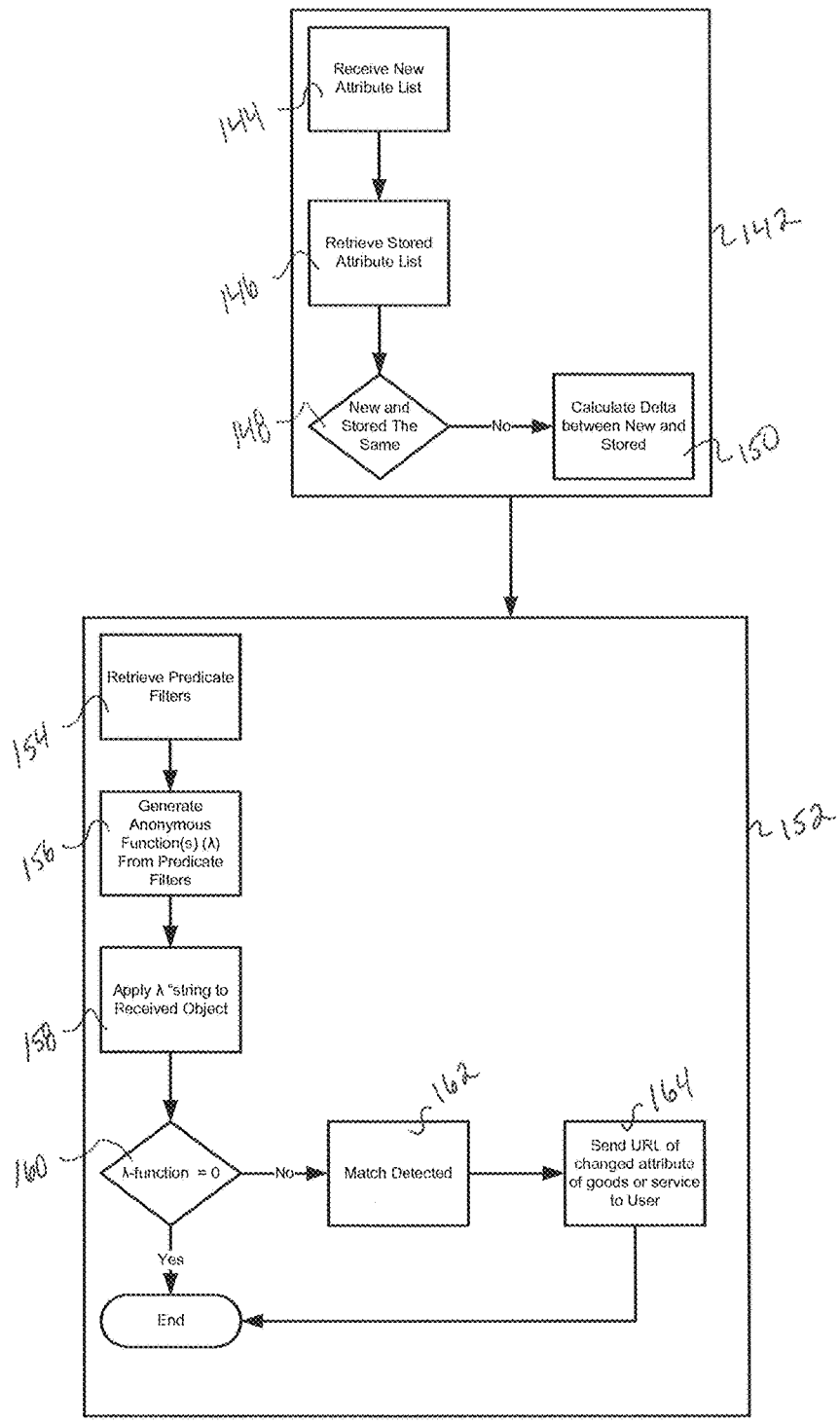
FIG. 5 is a flowchart of aspects of the invention.

Referring to FIG. 5, one aspect of the invention is described. A first process 142 is initialed that includes an attribute list of an object; objects can include search results. The attributes of the object can be unique to that object and need not be predefined in the computer readable instructions, but can be created on-the-fly. The attributes of the object are retrieved from the server at 144. At 146, an attribute list for the object that has been previously stored is retrieved. A determination whether the new attribute list and the stored attribute list are the same is made at 148. If there is a difference between the new and stored attribute list, the delta is calculated at 150 and stored.

A second process is then initiated at 152 by the first process. The second process retrieves predicate filters for the attribute list at 154. For example, filters can include price levels, quantity, brand information, shipping location and the like. A set of anonymous functions ($\lambda$s) are generated in memory from the predicate filters at 156. In this embodiment, the $\lambda$s are generated in real time and stored on temporary memory rather than being specifically included in the computer readable instructions providing for significant speed in operation and flexibility to generate $\lambda$s as needed. Therefore, the $\lambda$s need not be predetermined prior to the execution of the computer readable instructions. An object with these attributes are then processed by the $\lambda$s at 158. If the $\lambda$s return a non-zero result at 160, a match is detected at 162 and the user can be notified of the URL where the change has been detected at 164. For example, if the price drops to a certain level, the user can be notified.

Figure 6:
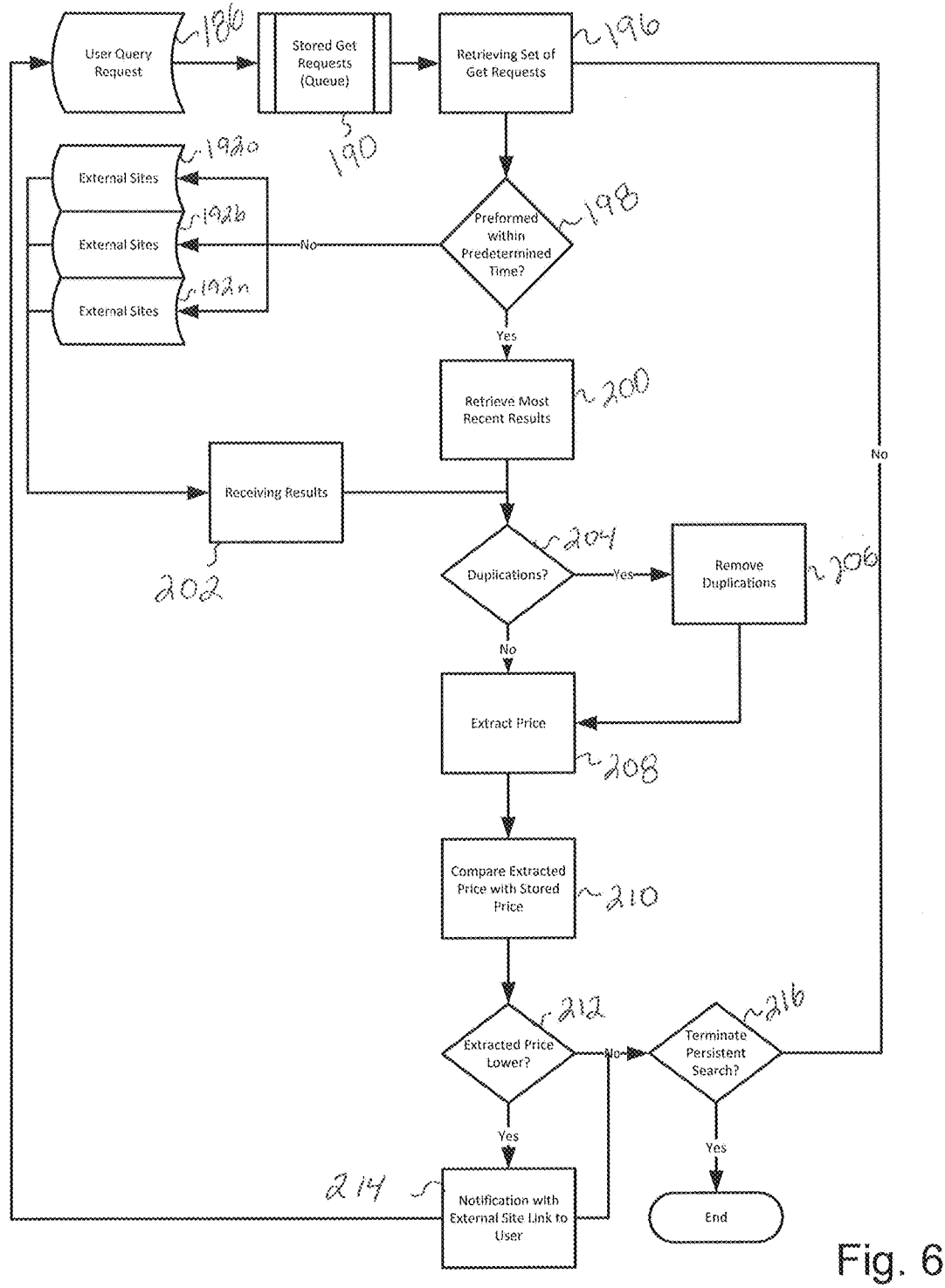
FIG. 6 is a flowchart of aspects of the invention.
Figure 7:
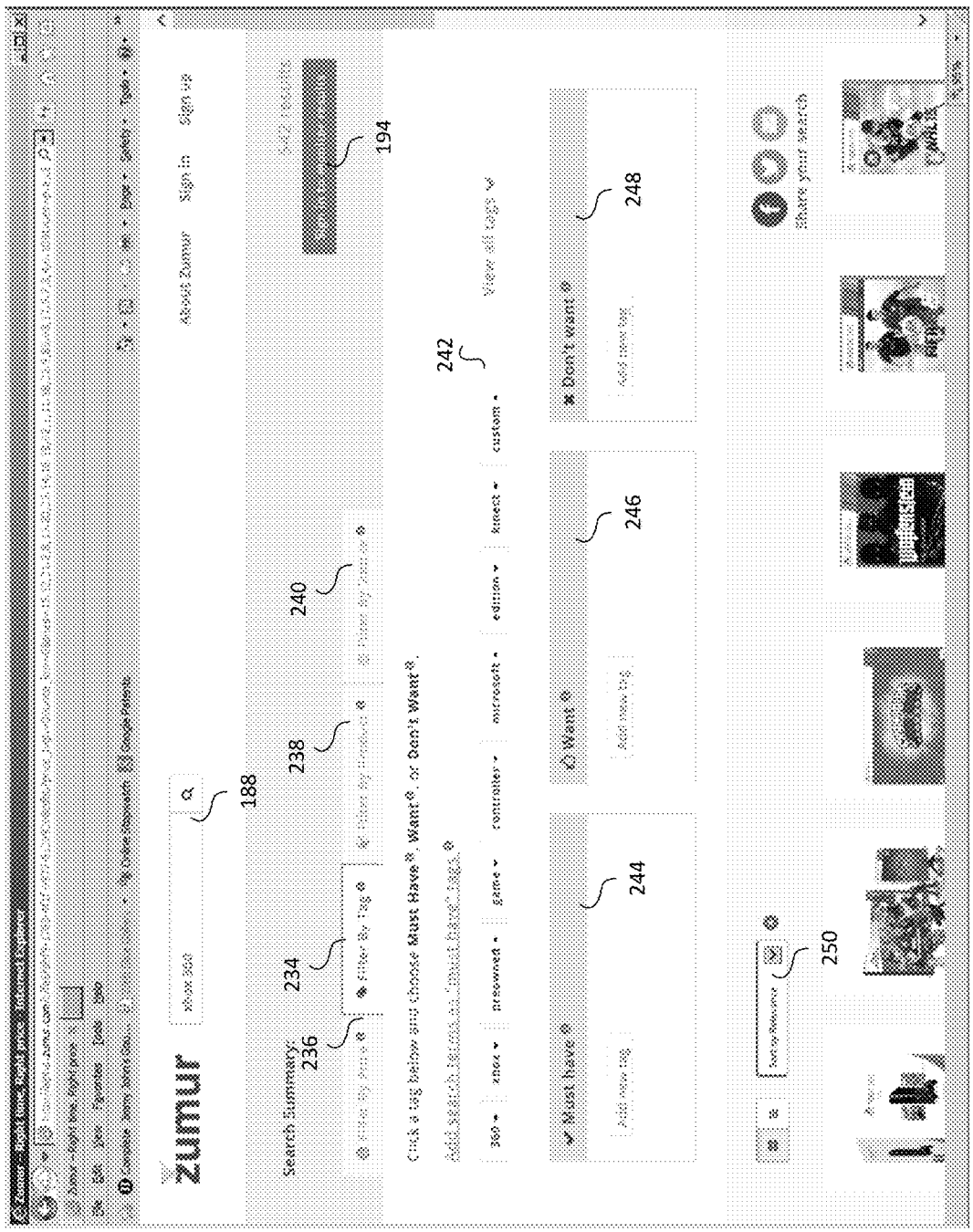
FIGS. 7 and 8 are schematics of aspects of the invention.
Figure 8:
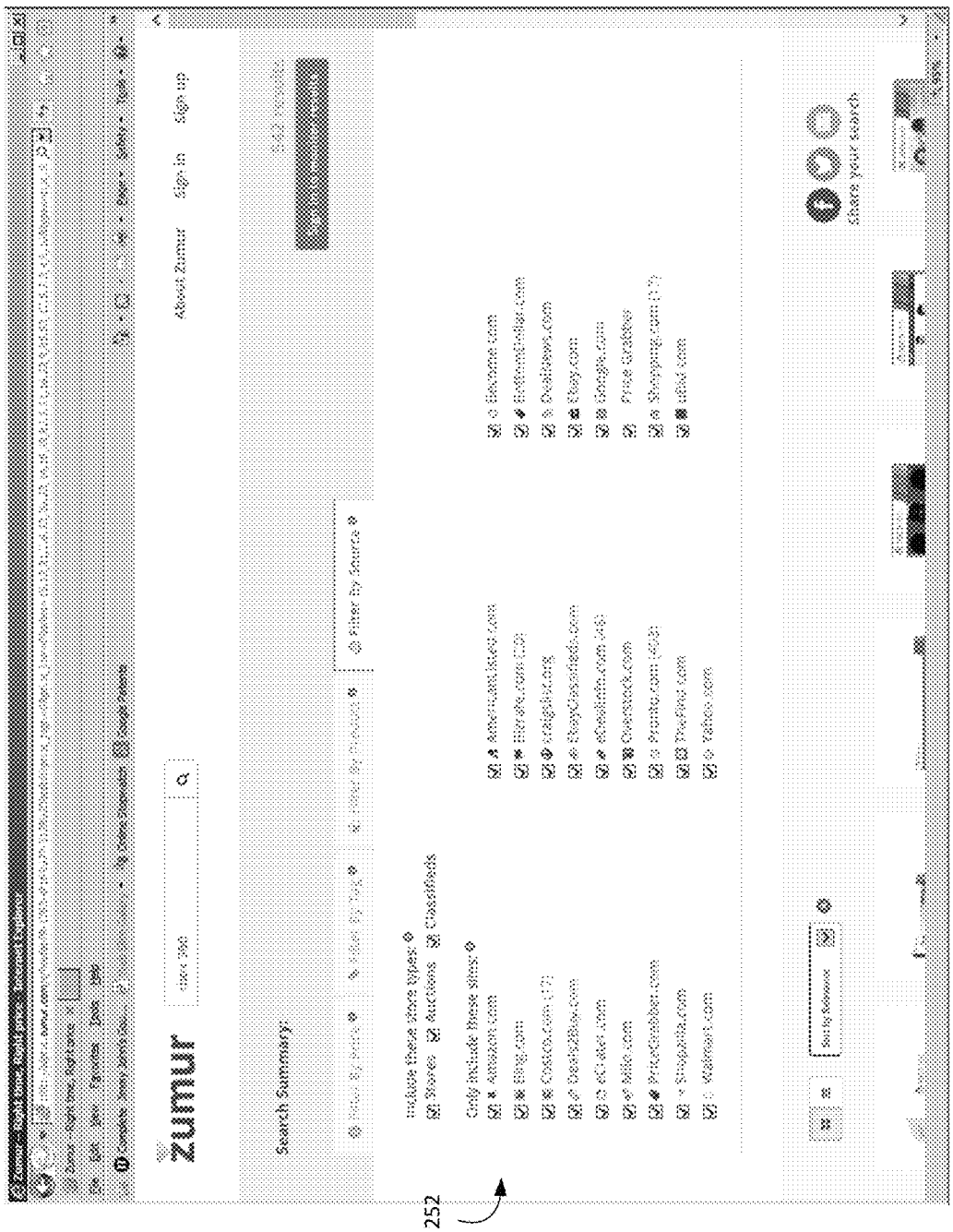

Referring to FIG. 6, the invention is described in more detail. The user query request 186 is generated by entering in search terms in a field 188 (FIG. 7) using a remote user's computer device that is in communications with the server. The search request is then formatted into a set of get requests and stored on a queue at 190. The get requests are formatted for each associated external site 192*a* through 192*n* for the number of external sites desired to be searched. Examples of potential external sites are shown in FIG. 8 where the external sites can be selected. The user can indicate that a persistent search is desired by "monitoring the results" through indicator 194 (FIG. 7). If this functionality is selected, the computer readable instructions can then retrieve a set of the get requests for the item that the user wishes to monitor at 196. If the selected get requests have been performed within a predetermined period of time at 198, the requests from the most recent get requests are retrieved at 200. Therefore, there is not a need to re-run the search if the search is fairly "fresh". In one embodiment, the predetermined period of time is one day, in other embodiments, the predetermined period of time is 18 hours, 12 hours 6 hours, 3 hours and 1 hour. In one embodiment, a determination can be made if the get request has been executed within a predetermined prior of time or if the requested or desired item has appeared in other search results within a predetermined prior of time so that the get request will not be sent to the external site if either of these two conditions are met.

The predetermined period of time can be adjusted based upon the frequent of the search of the specific item. For example, if the item being searched is "XBOX 360", and the frequency of this search is high (e.g. 10% of all search terms), the predetermined prior of time can be shortened to capture more prices changes. The predetermined period of time can also be shortened if the determination that the extracted price (described below) is lower than the stored price with a high frequency. For example, if the extracted price is lower than the stored price more than 25% of the time, the predetermined prior of time can be shortened.

In the event that the get request has not been run in the predetermined prior of time, the get request can be sent to the external sites and the result can be received at 202. A determination can be made at 204 if there are duplications in the result and these can be removed at 206 if they exist. The price can be extracted from the search results at 208 and compared with a previously stored price at 210. If the extracted price is lower than a previously stored price at 212, a notification is created at 214 and it can be transmitted to the user or made available to the user for the user's retrieval. IF the persistent search is to end as determined at 216, the process terminates. Otherwise, the process continues to search and compare items based upon the user's search desires.

In one embodiment, a notification is generated when the extracted price is within a price range around the stored price or within a predetermined percentage of the price in the stored results. When the notification is generated to the user, the notification can include a link (such as a URL) to the external site providing the user with ah purchasing opportunity.

Referring to FIG. 7, the invention can include filtering by tags by using tab 234, filtering by price 236, filter by product (item) at 238 and filtering by source (external site) at 240. A list of tags can be displayed as extracted from the research results at 242 and the tags can be given the status Must Have 244, Want 246 and Don't Want 248. Sorting options 250 are also provided.

Referring to FIG. 8, when the user wishes to select specific item searches (external sites), the use is provided with a list 252. Further, option for categories of sources can be selected such as stores, auction and classifieds. Each of the sources can include its own fetcher or set of fetchers.

Figure 9:
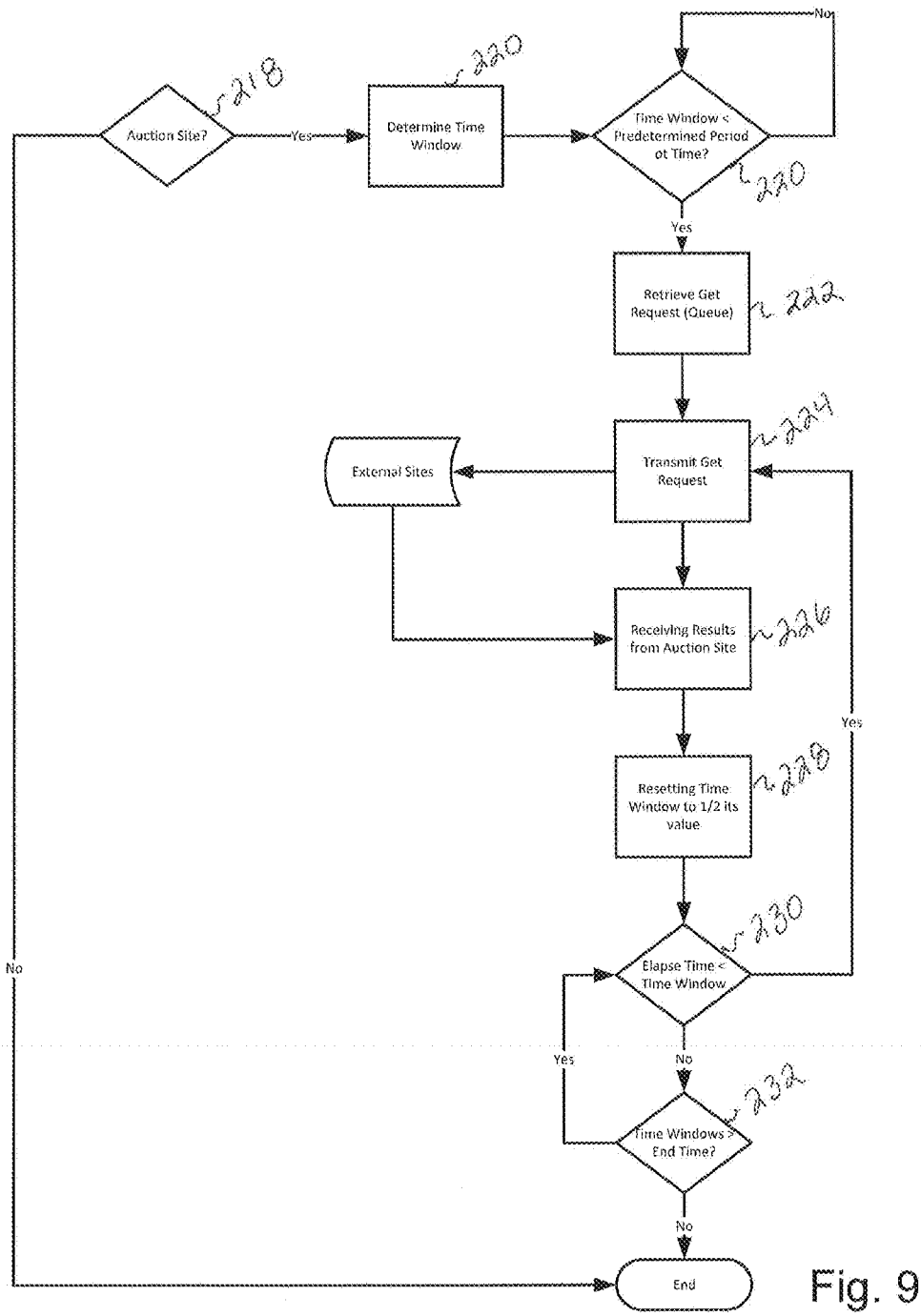
FIG. 9 is a flowchart of aspects of the invention.

Referring to FIG. 9, the process concerning the external site being an auction site is explained. If the determination is made that the external site is an auction site at 218, a time window if determine for the auction site at 220. The time window is when the auction ends. In one embodiment, the time window exceeds a predetermined period of time at 222, the process waits until the time window [s] is sufficiently lowered. In one embodiment, the predetermined prior to time is twenty-four hours. For an auction site, the set of get request is retrieved off the queue at 222 and can be transmitted to the external site at 224. The requests are received form the external site at 226 and the time windows is reset to one-half of its value at 228. If the elapse time is less than the time window at 230, the process returns to 224, otherwise, a determine if made if the time window is greater than a predetermined end time at 232. If the time window is less than the predetermined end time, the process ends, otherwise it returns to 230. In one embodiment, the predetermined end time is sixty seconds.

Figure 10:
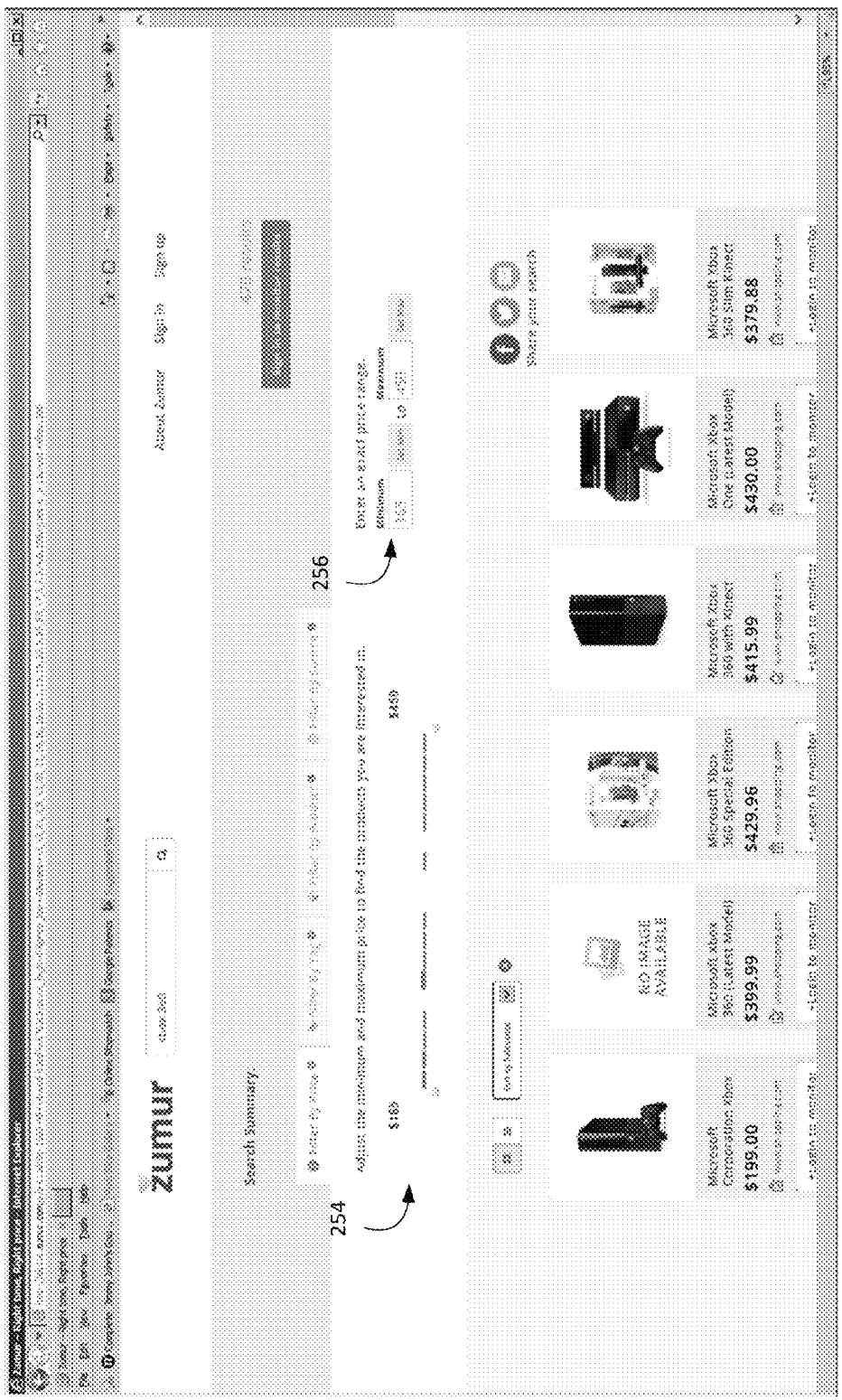
FIG. 10 is a schematic of aspects of the invention.

Referring to FIG. 10, a graphical representation 254 showing a distribution of the items in the search results organized by price is shown. In this embodiment, the bar graph is used to show the number of items discovered at a particular price. By providing this information, the user is much better able to refine the search to provide results more closely meeting the user's desires and requirements. The user can adjust the price range at 256. When the search results is displayed in price order, the information available to the user for modification to the search is enhanced.

It is understood that the above descriptions and illustrations are intended to be illustrative and not restrictive. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A system for providing persistence searching for consumer items comprising a server having a processor, computer readable medium, and a set of computer readable instructions, that when executed by the processor, perform the steps of:

retrieving a set of GET requests uniquely associated with external vendor sites from a GET request queue wherein each GET request is specifically formatted for its respective external vendor site, determining if the set of GET requests has been performed within a predetermined period of time and, if not, simultaneously transmitting each GET request in the set of GET requests to its respective external vendor site, asynchronously receiving current results from the external vendor sites in response to the set of GET requests, determining if a duplicate item are present in the current results and deleting the duplicate items from the current results, extracting a price from the current results for each item contained in the current results received from the external vendor sites, comparing the price of the current results with a price of a previously stored results for each item from each external vendor site, generating a notification representing that the price of the current results is lower than the price of the stored results, if the price of the current results is lower, wherein the notification includes a link to the external vendor site to provide a purchasing opportunity to a user representing that the price of the current results is lower than the price of the stored results, and transmitting the notification to a remote user's computer device that is in communications with the server.

2. The system of claim 1 wherein the set of computer readable instructions includes instructions to generate a notification representing that the price of the current results is within a predetermined range of the price of the stored results.

3. The system of claim 1 wherein the set of computer readable instructions includes instructions to generate a notification representing that the price of the current results is within a predetermined percentage of the price of the stored results.

4. The system of claim 1 wherein one external vendor site is an auction site and the set of computer readable instructions includes auction site instructions for the auction site for:
   determining a time window of the auction site,
   retrieving a GET request associated with the auction site from the GET request queue,
   (a) transmitting the GET requests to the auction site,
   (b) receiving results according to the GET request,
   (c) resetting the time window to half its value,
   determining if an elapsed time is less than the time window value, and
   performing instructions (a) through (c) if the elapsed time is less than the time window and for so long as the time window is greater than a predetermined end time.

5. The system of claim 4 wherein the predetermined end time is sixty seconds or less.

6. The system of claim 4 wherein the auction site instructions include instructions for:
   determining if the time window is greater than a predetermined period of execution time and
   halting the execution of the auction site instructions if the time window is greater than the predetermined period of execution time.

7. The system of claim 6 wherein the predetermined period of execution time is 24 hours or greater.

8. The system of claim 7 wherein the predetermined period of execution time is 24 hours.

9. A system for providing persistence searching for a target goods or services having a server with a processor and computer readable medium comprising:
   a set of computer readable persistent agent instructions stored on the server for:
      (i) determining if a GET request has been executed within a GET request execution predetermined period of time,
      (ii) determining if the target goods or services have appeared in results with a predetermined period of time and if neither (i) or (ii),
         executing a set of GET instructions that simultaneously transmit a set of GET requests to the target goods or services respective external sites asynchronously,
         receiving current results from the external sites in response to the set of GET requests,
         extracting a price from the current results for each target goods or services contained in the current results received from the external sites,
         comparing the extracted price of the current results with a price of a previously stored result for each external site, and
         generating a notification representing that the price of the current results is lower than the price of the stored results if the price of any target goods or services in the current results is lower than the price of the target goods or services in the stored results.

10. The system of claim 9 wherein the GET instructions include instructions for including in the notification a link to the external site where the price of the current results is lower than the price of the stored results.

11. The system of claim 9 including a set of auction instructions for:
   determining if the external site is an auction site and if so determining a time window of the auction site,
   retrieving a GET request associated with the auction site from the GET request queue,
   (a) transmitting the GET requests to the auction site,
   (b) receiving results according to the GET request,
   (c) resetting the time window to half its value,
   determining if an elapsed time is less than the time window value, and
   performing instructions (a) through (c) if the elapsed time is less than the time window and for so long as the time windows is greater than a predetermine end time.

12. The system of claim 11 wherein the predetermined end time is sixty seconds or less.

13. The system of claim 9 wherein the set of computer readable persistent agent instructions include instructions for:
   determining if search results matching the target are being retrieved from a queue for objects with increased frequency and if so,
   executing the computer readable persistent agent instructions with increased frequency.

14. A system including a server having a computer readable medium and processor for providing persistence searching for a target comprising:
   a set of idempotence search instructions for:
      receiving target information representing a desired item,
      formatting the target information into a user GET request,
      placing the user GET request on a user GET request queue;
   a set of fetcher instructions for:
      retrieving the user request from the user request queue,
      formatting the user request for a specific external site associated with the fetcher instructions,
      transmitting the GET request to the external site,
      receiving a result in response to the GET request,
      placing the result on a result queue and;
   a set of persistent agent instructions for:
      determining if results have been received within a predetermined period of time, and
      executing the fetcher instructions if the results have not been received within a predetermined period of time,
      receiving, asynchronously, current results from the external sites,
      extracting a price from the current results for each item contained in the current results received from the external sites,
      comparing the extracted price of the current results with a price of previous results placed on the queue for each of the external sites,
      generating a notification representing that the price of the current result is lower than the price of the stored result if the price of one current result is lower than the price of the stored results, and including in the notification a link to the specific external site associated with the price of the current result is lower than the price of the stored results.

15. The system of claim 9 including a set of auction instructions for:
  determining if the external site is an auction site and if so, determining a time window of the auction site,
  retrieving a GET request associated with the auction site from a GET request queue,
  (a) transmitting the GET request to the auction site,
  (b) receiving results according to the GET request,
  (c) resetting the time window to half its value,
  determining if an elapsed time is less than the time window value and
  performing instructions (a) through (c) if the elapsed time is less than the time window and for so long as the time window is greater than a predetermine end time.

16. The system of claim 15 wherein the predetermine end time of equal to or less than sixty seconds.

17. The system of claim 15 wherein the persistent agent instructions include instructions for generating a notification representing that the price of the current results is within a predetermined range of the price of the stored results.

18. The system of claim 15 wherein the persistent instructions includes instructions for generating a notification representing that the price of the current results is within a predetermined percentage of the price of the stored results.

19. The system of claim 14 wherein each persistent search instructions in the set of persistent agent instructions is associated with a unique user request.

20. The system of claim 14 where each fetchers instructions from the set of fetcher instructions is associated with a user request.

* * * * *